(12) United States Patent
Cornelius et al.

(10) Patent No.: US 10,702,881 B2
(45) Date of Patent: *Jul. 7, 2020

(54) COATING APPARATUS AND COATING METHOD FOR GRANULAR BODIES

(71) Applicant: Robert Bosch GmbH, Stuttgart (DE)

(72) Inventors: Hans Dieter Cornelius, Dresden (DE); Ralf Kretzschmar, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 92 days.

This patent is subject to a terminal disclaimer.

(21) Appl. No.: 15/958,473

(22) Filed: Apr. 20, 2018

(65) Prior Publication Data

US 2018/0311694 A1 Nov. 1, 2018

(30) Foreign Application Priority Data

Apr. 26, 2017 (DE) .................... 10 2017 206 979

(51) Int. Cl.
| | |
|---|---|
| *B05B 13/02* | (2006.01) |
| *B05B 15/25* | (2018.01) |
| *B05D 1/02* | (2006.01) |
| *B05D 3/04* | (2006.01) |
| *A23G 3/34* | (2006.01) |
| *A61J 3/00* | (2006.01) |

(Continued)

(52) U.S. Cl.
CPC ........ *B05B 13/0235* (2013.01); *A23G 3/0095* (2013.01); *A23G 3/26* (2013.01); *A23P 20/18* (2016.08); *A61J 3/005* (2013.01); *B01J 2/006* (2013.01); *B01J 2/12* (2013.01); *B05B 13/0257* (2013.01); *B05B 13/0278* (2013.01); *B05B 15/25* (2018.02); *B05D 1/02* (2013.01); *B05D 3/0413* (2013.01); *B05D 3/0426* (2013.01); *B05D 2258/00* (2013.01)

(58) Field of Classification Search
CPC ......... A23G 3/0095; A23G 3/26; A23P 20/18; A61J 3/005; B01J 2/006; B01J 2/12; B05B 13/0235; B05B 13/0257; B05B 13/0278; B05B 15/25; B05D 1/02; B05D 2258/00; B05D 3/0413; B05D 3/0426
See application file for complete search history.

(56) References Cited

U.S. PATENT DOCUMENTS 10,363,532 B2 * 7/2019 Cornelius ............ A23G 3/0095

FOREIGN PATENT DOCUMENTS

WO 2006108280 10/2006

* cited by examiner

*Primary Examiner* — Alexander M Weddle
(74) *Attorney, Agent, or Firm* — Michael Best & Friedrich LLP (57) ABSTRACT

In the coating apparatus for granular bodies is disposed a rotatable hollow cylindrical drum in which there is an introduction apparatus for granular bodies and at least one movable separating element therein, with which a cycle zone can be partly separated from a downstream cycle zone and a movement of the at least one separating element that leads to release is achievable. An interior of the drum is divided into at least one cycle zone and a further cycle zone. A spray apparatus is disposed in one cycle zone, and an outlet in a cycle zone arranged downstream. A separating element is movable from a closed position into an open position. A separating element has a clear space above the closed subregion and an opening between one cycle zone and a cycle zone arranged thereafter, through which granular bodies can pass.

20 Claims, 4 Drawing Sheets

(51) Int. Cl.
*A23G 3/26* (2006.01)
*B01J 2/00* (2006.01)
*A23P 20/18* (2016.01)
*B01J 2/12* (2006.01)

COATING APPARATUS AND COATING METHOD FOR GRANULAR BODIES

BACKGROUND OF THE INVENTION

The present invention relates to a coating apparatus and to a coating method for granular bodies, preferably tablets or pills.

It is possible by means of drum coaters to apply a functional layer in the form of a film layer to pressed tablet cores. This functional layer generally consists of water-soluble monomers in which removal of water and poly reaction are followed by chain formation to give homo- and copolymers. The task of this functional layer is to protect an active ingredient present in the tablet core from the action of light or oxygen, to prevent premature dissolution owing to excessively high ambient humidity during storage, or to allow the active ingredient to show its effect only in particular zones of the digestive tract. Very high quality demands are therefore made on functional layers of this kind.

There are drum coaters in different designs for the coating to be conducted. They can essentially be divided into batch coaters and continuous drum coaters. While application of functional layers by means of batch coaters no longer constitutes a technical challenge, there are still considerable problems in the case of drum coaters in applying a functional layer with uniform thickness on the surface of the tablet. Document WO 2006/108280 A1 describes, for example, a continuous drum coater that achieves the very high demands on layer thickness distribution as necessary, for example, for stomach-resistant film coatings only with a considerable degree of complexity, if at all.

SUMMARY OF THE INVENTION

It is therefore an object of the present invention to develop a coating apparatus and a coating method that avoid the disadvantage mentioned, i.e. with which a very substantially uniform layer thickness on a surface of an individual body to be coated can be produced, and also a uniform surface coating compared to other coated bodies.

A coating apparatus for granular bodies, preferably tablets or pills, has a rotatable, hollow cylindrical, perforated drum for accommodating the granular bodies. In the drum there is an introduction device, preferably with a coater door and coater housing for the granular bodies, while at least one movable separating element is disposed in the drum. The movable separating element divides an interior of the drum into cycle zones in longitudinal direction. Further apparatuses are disposed in at least one cycle zone in the drum. These may be a spray apparatus for application of a liquid or suspension with which a coating can be formed on surfaces of the granular bodies. An outlet for removal of the coated granular bodies from the drum may be formed by a coater door and a coater door housing. The at least one separating element is movable from a closed position, in which a closed subregion of an underside of the at least one separating element lies radially flush against an inner wall of the drum or is arranged at a distance from the inner wall of the drum with a gap measuring less than the external diameter of the granular bodies, into an open position, in which the underside of the respective separating element at least in one region has a greater distance from the inner wall of the drum than the external diameter of the granular bodies. The at least one separating element is designed so as to leave a continuous clear space above a closed subregion of the separating element between a cycle zone, a cycle zone arranged downstream in process direction, or an outlet for removal of coated granular bodies from the drum.

In the open position, the subregion is spaced apart at its underside from the inner wall of the drum and in this position of the separating element there is an opening in the lower region between the underside of the separating element and the inner wall of the drum between one cycle zone, a cycle zone arranged downstream thereof or the outlet. Granular bodies can pass through this opening. In at least one of the cycle zones, there may advantageously be at least one radial paddle for mixing of the granular bodies on rotation of the drum disposed on the inner wall of the drum.

By means of the movable separating element, the granular bodies in the form of a bulk material or batch/charge are treated with different process steps in separate cycle zones in the drum without any adverse mutual effect of the process steps that proceed in the different cycle zones. Moreover, the throughput can be increased since, as a result of the cycle, it is possible for different process steps to proceed simultaneously in parallel. This also creates the boundary conditions for clocked flow production of granular bodies, which promote coating of uniform thickness. By virtue of the respective separating element being movable into various positions, exchange of the granular bodies between the cycle zones can be effected easily and rapidly. By virtue of the opening being formed in the open position between the respective separating element and the inner wall, which is typically an inner wall of the drum, the granular bodies can additionally move along this inner wall in the base region into the cycle zone arranged downstream in process direction or to the outlet without additional complexity. With the aid of the at least one radial paddle, it is possible to assure permanent mixing of the granular bodies during the rotating of the drum. By virtue of the design of separating element with the eccentrically arranged axis of rotation of a separating element, it is possible to achieve reliable separation of cycle zones without damage to granular bodies and without wear on the inner wall of the drum and on the underside of a separating element pointing in the direction of the inner wall of the drum. A gap may be present between the underside of a separating element and the inner wall in the closed position, of such a size that no granular bodies can get through the gap and there is no occurrence of any indirect contact of the underside of a separating element with the inner wall of the drum. The underside of a separating element may also be provided with a coating having a friction-reducing effect. A coating may be formed, for example, from PTFE.

A perforation in the drum wall enables assurance of supply of air and removal of air, for example in the case of heating, cooling or drying of the granular bodies or coatings applied thereto. For this purpose, the perforation may have round apertures, but rectangular, elliptical or differently shaped apertures are of course also possible.

The drum is preferably formed from multiple drum elements which can in turn define cycle zones. The introduction apparatus may be a loading stub, while the outlet may take the form of an emptying chute. The spray apparatus may take the form of a nozzle arm.

The drum can also be cleaned by means of water. For this purpose, what are called troll balls can typically be placed in the interior of the drum and special high-pressure nozzles can additionally be used from the outside. Controlled water efflux can be effected via a wet cell in which the drum is disposed. This wet cell can additionally channel the feed air and the waste air as well. Through a perforated inner wall of the drum, even at low speeds in the rotation of the drum, a kidney-shaped bed of the granular bodies arises.

Typically, the at least one separating element is arranged and aligned orthogonally to the axis of rotation or longitudinal axis of the drum. In this way, the respective separating element can be moved into the open position without any great hindrance by the granular bodies and in particular without hitting the radial paddle or the radial paddles. In addition, the respective separating element can be movable orthogonally to the longitudinal axis by a linear movement or preferably rotatable about a second axis of rotation arranged eccentrically and at a distance from the center of the circle defined by the radius of the curved form of the underside of the at least one separating element and aligned parallel to the axis of rotation of the accommodation unit. By means of a second axis of rotation which is eccentric, i.e. spaced apart from the axis of rotation as the center of the rotational movement, the respective separating element can be transferred reliably to the open position even during rotation of the drum. It is also possible for the at least one separating element to be arranged so as to be movable along the longitudinal axis of the drum. It is thus not an indispensable prerequisite to configure the individual cycle zones with equal length, even though this is favorable with regard to a length of individual process steps. With increasing batch/charge size or stack size, the height of this layering of a bed formed with the granular bodies, which are typically in the form of a bed of tablets or tablet cores, for the purpose of better mixing action via the radial paddle or the radial paddles, can be optimized by means of alteration of the cycle zone length.

The axis of rotation of the at least one separating element or in the case of presence of multiple separating elements should be arranged at a distance from the drum in the opposite direction in relation to the direction of rotation of the drum alongside and preferably also above the axis of rotation of the drum. It is thus possible to prevent granular bodies from being trapped between the underside of the respective separating element and the inner wall of the drum. This is because the rotational movement of the drum results in formation of a wedge-shaped field formed by the granular bodies moved by the rotation, which has a greater height level at the inner wall of the drum in the bed formed in the direction of rotation of the drum than in the middle of the drum.

It may be the case that a tilting or pivoting apparatus is disposed on the drum, by means of which the drum can be tilted at various angles, such that, under the action of gravity, on implementation of a tilt, granular bodies are movable between the cycle zones and/or out of the outlet, especially out of a cycle zone with spray apparatus or out of the coating apparatus with the separating element open. This tilt is generally implemented in the direction of the outlet. Preferably, the tilting or pivoting apparatus is disposed beneath the drum and has a pivot bearing and at least one hydraulic cylinder as tilt or pivot drive. By simple tilting or pivoting of the drum, the granular bodies can thus be moved in a simple manner between the various cycle zones and removed from the drum or the coating apparatus. Typically, for tilting or pivoting, an end of the drum at which the outlet is disposed is lowered. Alternatively, however, it is also possible to raise an end of the drum at which the introduction apparatus, preferably with a coater door, is disposed. It may also be envisaged, in addition to the tilting or the pivoting, that alternating swiveling of the drum about its axis of rotation or longitudinal axis be conducted in order to dissipate the bonding friction between the granular bodies with one another and the granular bodies and the inner wall of the drum and to move the granular bodies within the drum or remove them from the drum in a sliding manner.

There are typically two mounts disposed on the drum, by means of which the drum is movable by means of a drive motor. The bearings assure reliable rotation of the drum.

In a preferred manner, there are at least three cycle zones provided in the drum. With at least two separating elements it is possible to form three cycle zones, or with at least three separating elements to form four cycle zones, in the drum, mainly the spray section, a measurement section, a further spray section as the second cycle zone designed for spraying, and the outlet. In the cycle zone arranged first in process direction, a spray apparatus should be provided as the first spray apparatus. In the cycle zone arranged downstream, there should be disposed a measurement module for determining the layer thickness of the coating on surfaces of granular bodies. This may preferably be a measurement apparatus for conducting optical coherence tomography. In a further cycle zone arranged downstream in process direction, a further spray apparatus may be provided. In this way, correctly coated granular bodies can be dried, cooled and removed. The division into multiple cycle zones allows the coating to be conducted with finer adjustment. The second coating and intermediate measurement increases the accuracy of the application of the coating, since the layer thickness of the coating applied first is already known before the second coating. It is thus possible to minimize the overall error as a deviation between target layer thickness and the layer thickness actually applied. Since the measurement module may be arranged in a dedicated cycle zone, optical components of the measurement module are not exposed to spray mist. Typically, a greater layer thickness is applied in a cycle zone with spray apparatus in the first coating than in a cycle zone arranged downstream in process direction in the second coating. Preferably, a distribution of the layer thicknesses between the first coating and the second coating may be two thirds to one third, but may also be three quarters to one quarter. Typically, after the intermediate measurement, the respective spray rate for the second coating is calculated by an electronic evaluation and control unit.

An introduction section may also be formed, which is separated by a fourth separating element from the cycle zone with spray apparatus arranged first in process direction and in which is disposed or into which projects the introduction apparatus, in which case there is only a spray apparatus disposed in this cycle zone. By means of a separate introduction section, it is possible for granular bodies present in this cycle zone first to be dried and preheated, in order to remove any residual moisture still present and to coat the granular bodies only thereafter in this cycle zone. It may of course also be the case that two separating elements are provided, which form the cycle zones as first spray section, the measurement section and the further spray section as second spray section, in which case drying and preheating or drying and cooling can be effected in the cycle zones with spray apparatus.

The cycle zones with spray apparatus are typically designed such that drying of the coated granular bodies still proceeds with the drum rotating before or after the spraying, in order to prevent individual granular bodies from sticking to one another.

There are preferably no radial paddles disposed in the cycle zone in which there is a measurement module, such that a monotonously flowing bed of the granular bodies arises here, which brings advantages with regard to the measurement of layer thickness. Alternatively, radial paddles may be arranged in all cycle zones. In the case of optical measurement modules which work within a near-infrared range, i.e. a range of electromagnetic radiation with a wavelength between 780 nm and 1 µm, up to a region of terahertz radiation, i.e. electromagnetic radiation having a wavelength between 1 µm and 1 mm, measurement resolution can be significantly impaired by intensive, directionless movement of the granular bodies that otherwise exists, as in the case of the standard batch coaters. It is therefore advantageous when the measurement of the layer thickness takes place where the monotonously flowing bed mentioned is present in a cycle zone without radial paddles.

Alternatively or additionally, it is possible for a support bar running parallel to the longitudinal axis to be disposed as a guide bar at a fixed location in the drum, which is typically designed as a nozzle arm with mountable spray nozzles, or the spray apparatuses and, if present, a measurement module is/are arranged so as to be movable. By means of the movable arrangement, it is possible to rapidly adjust the components mentioned to altered conditions in the interior of the drum.

It may also be the case that an accommodation frame disposed outside the drum can be connected to the support bar in a pivotable manner, such that the accommodation frame, with the accommodation unit open, is flush against the support bar and the spray apparatus or the spray apparatuses and/or the measurement module is/are movable out of the interior of the drum onto the accommodation frame outside the drum. By means of the movement out of the interior onto the accommodation frame disposed outside the drum, the spray apparatuses and the measurement module can be maintained or exchanged.

The drum typically has a coater door housing at either end, on which there is secured the support bar and there is disposed a coater door and a mount for a shaft connected to the at least one separating element.

A method of coating granular bodies, preferably tablets or pills, is typically conducted with the coating apparatus already described. The apparatus is thus designed for performance of the method described in detail hereinafter.

In the method, the granular bodies to be coated can be introduced through an introduction apparatus into the hollow cylindrical drum of the coating apparatus. The drum is set in rotation and, with the drum rotating, the granular bodies are coated with a spray apparatus in the cycle zone arranged first in process direction. This cycle zone is formed by a separating element disposed within the drum, which is in the closed position during the coating of the granular bodies and remains in this position during the coating. In the closed position, a closed subregion of the underside of the at least one separating element lies radially flush against the inner wall of the drum, and a clear space remains between the cycle zone arranged first and a cycle zone arranged downstream in process direction or an outlet of the drum above the closed subregion.

In a cycle zone with spray apparatus or a cycle zone downstream in process direction, in which there is preferably no measurement module, the granular bodies can be dried with the drum rotating. An inlet for granular bodies, cycle zones and an outlet for ready-coated granular bodies can be separated from one another by at least one separating element in each case. If further additional cycle zones are provided, these may likewise be separated from one another by at least one separating element in each case.

After a movement of the respective separating element into the open position, in which the subregion on the underside is spaced apart from the inner wall of the drum and an opening between a cycle zone and a cycle zone arranged downstream or the outlet has been provided in the lower region between the underside of the respective separating element and the inner wall of the drum, the granular bodies are moved into the cycle zone arranged downstream in each case or removed from the outlet from the drum. For transportation of the granular bodies, the drum may be tilted or pivoted about a tilt axis orthogonal to the axis of rotation by means of a tilting or pivoting apparatus arranged on the drum.

Alternatively or additionally, for transportation of the granular bodies out of the drum or for transportation of the granular bodies between the cycle zones, especially between a cycle zone with spray apparatus, a cycle zone without spray apparatus or the outlet, the at least one separating element may be movable parallel to the axis of rotation of the drum. For transportation of the granular bodies, the respective closed separating element in the drum is moved in the direction of an outlet from the drum to such an extent that the granular bodies are removed from the coating apparatus through an outlet of the drum and/or granular bodies are moved from a cycle zone with spray apparatus into a cycle zone arranged downstream or to the outlet. Subsequently, the respective separating element is moved to the open position in which the subregion is spaced apart from the inner wall of the drum at the underside of the separating element and there is an opening in the lower region between the underside of the separating element and the inner wall of the drum. The respective separating element is then moved back to an original position, where it is moved into the closed position. In this way, the granular bodies can be shifted within the drum in a simple manner by the separating element.

In the methods described, in at least one of the cycle zones, there should be at least one radial paddle disposed at the inner wall of the drum and/or at at least one side of at least one separating element, by means of which the granular bodies are mixed on rotation of the drum. The radial paddle(s) make(s) it possible to conduct uniform coating of the granular bodies in the drum, since the granular bodies at uniform time intervals pass through a center of a spray mist generated by the spray apparatus and align their surface sections alternately to the spray jet of the spray apparatus. This is achieved by the radial paddle(s), in that constant mixing of the granular bodies is achieved with alternating alignment of the surface sections to the spray apparatus. From the filling to the emptying, the granular bodies move in constant flow on a base of the inner wall of the drum.

The at least one separating element may be aligned orthogonally to the longitudinal axis in the drum and, for opening, may be moved by a linear movement orthogonally to the longitudinal axis of the drum or preferably rotated about a second axis of rotation arranged eccentrically in the drum and at a distance from the center of the circle defined by the radius of the curved form of the underside of the at least one separating element and aligned parallel to the axis of rotation of the drum.

Typically, there are three separating elements disposed in the drum. In this way, the cycle zones for spraying and for determination of the layer thickness of the coatings applied to surfaces of granular bodies may be formed. The at least three separating elements are each movable into the closed position already described and the open position likewise already described. In the cycle zone with spray apparatus arranged first, it is advantageously possible to apply a first portion of the coating to the granular bodies. In the cycle zone arranged downstream, the layer thickness of the coating applied in the cycle zone arranged first can then be measured, preferably determined by optical coherence tomography. In a further cycle zone with spray apparatus arranged downstream in process direction of the cycle zone in which the layer thickness determination has been conducted, it is then possible to apply a second portion of the coating up to a defined target layer thickness. In this cycle zone or a further downstream cycle zone, the coated granular bodies can be dried, cooled and then removed from the drum.

It may be the case that, by virtue of a fourth separating element arranged in the drum, a further cycle zone separated from the cycle zone with spray apparatus may be present, into which uncoated granular bodies can be introduced into the drum. In this cycle zone which is then arranged as the very first, the uncoated granular bodies can be introduced into the drum and preheated. In all the method steps described, the drum is typically rotating.

A coating apparatus may be formed, for example, with a drum which can be divided into three cycle zones by means of at least two separating elements. In this case, in a first cycle zone formed proceeding from the introduction apparatus for granular bodies up to a first separating element, it is possible to achieve charging with granular bodies, heating in an air stream which is guided into the interior through a perforated wall in the drum, the spraying of the surfaces of the granular bodies with intensive mixing of the bed formed in the drum and the formation of a coating on the surfaces of the granular bodies. However, the maximum layer thickness of the coating to be achieved in each case should not be achieved in the first cycle zone.

This first cycle zone may be followed by a second cycle zone bounded by two separating elements, into which granular bodies coated in the first cycle zone beforehand can be conveyed on movement of the separating element arranged in the introduction apparatus/inlet direction. In this case, the second separating element arranged at the end of the cycle zone in the opposite direction is in a closed position in which the underside of this separating element adjoins the inner wall of the drum.

If the two separating elements are moved into the closed position, drying of the coating formed on the surfaces of granular bodies can be effected in the second cycle zone, especially by introducing heated air. On attainment of a suitable degree of drying, the layer thickness achieved in the coatings applied on the surfaces of the granular bodies can be determined, preferably by optical means. In this case, the layer thickness actually achieved by this juncture can be determined and this value can be utilized for influencing the ultimate coating which is still to be conducted in a third cycle zone arranged downstream of the cycle zone with measurement module for layer thickness determination. The third cycle zone begins at the separating element arranged at the end of the second cycle zone and extends up to the outlet or any further separating element arranged at that point.

The third cycle zone may be constructed or designed analogously to the first cycle zone. It is possible therein to conduct spraying of the surfaces already coated until the desired target layer thickness has been attained. The difference between the target layer thickness and the layer thickness formed in the first cycle zone and determined in the second cycle zone should be less than the layer thickness formed in the first cycle zone. In this way, the accuracy of the target layer thickness to be achieved can be increased by more accurately influencing the layer formation process in the third cycle zone.

The movement of the granular bodies from one cycle zone into the downstream cycle zone can be achieved by appropriate tilting of the drum and corresponding movement of the separating elements by rotation about an axis of rotation. In each case, a separating element arranged at another end of a cycle zone can be turned into an open position, while the other separating element remains in its closed position in which its underside is in contact with the inner wall of the drum.

The invention is to be elucidated in detail by a working example of a coater with 3 cycles.

The number of working cycles depends upon the extent to which the product-dependent process steps can be combined in one batch. For instance, in one cycle, for example in the case of high-value coatings, the intensive mixing of the granular bodies (tablet cores), for the purpose of homogeneous distribution of the coating on the surfaces of the granular bodies, cannot be combined with the inline measurement of the coating thickness up to a resolution of <1 µm. What is important is not only inexpensive continuous production; it is also possible to utilize the possible advantages of the invention for an improvement in quality.

BRIEF DESCRIPTION OF THE DRAWINGS

With the aid of drawings, according to FIGS. 1-4, the invention is to be elucidated in detail by way of example.

FIGS. 4a, 4b and 4c are sections through a drum with a view of one of the separating elements, in which FIG. 4a shows the cycle zones I and II separated from one another via a closed separating element lying with an end face against the inner wall of the drum, with the granular bodies (tablet cores) present in the lower portion of the drum, FIG. 4b shows the drum rotating in counterclockwise direction and forming a kidney-shaped bed formed with granular bodies (tablet cores), and FIG. 4c shows a separating element in the open position with a wedge-shaped opening present between the separating element and the inner wall of the drum in front of the bed, and the opening enables the transfer of granular bodies from one cycle zone into the adjacent cycle zone.

DETAILED DESCRIPTION

Figure 1:
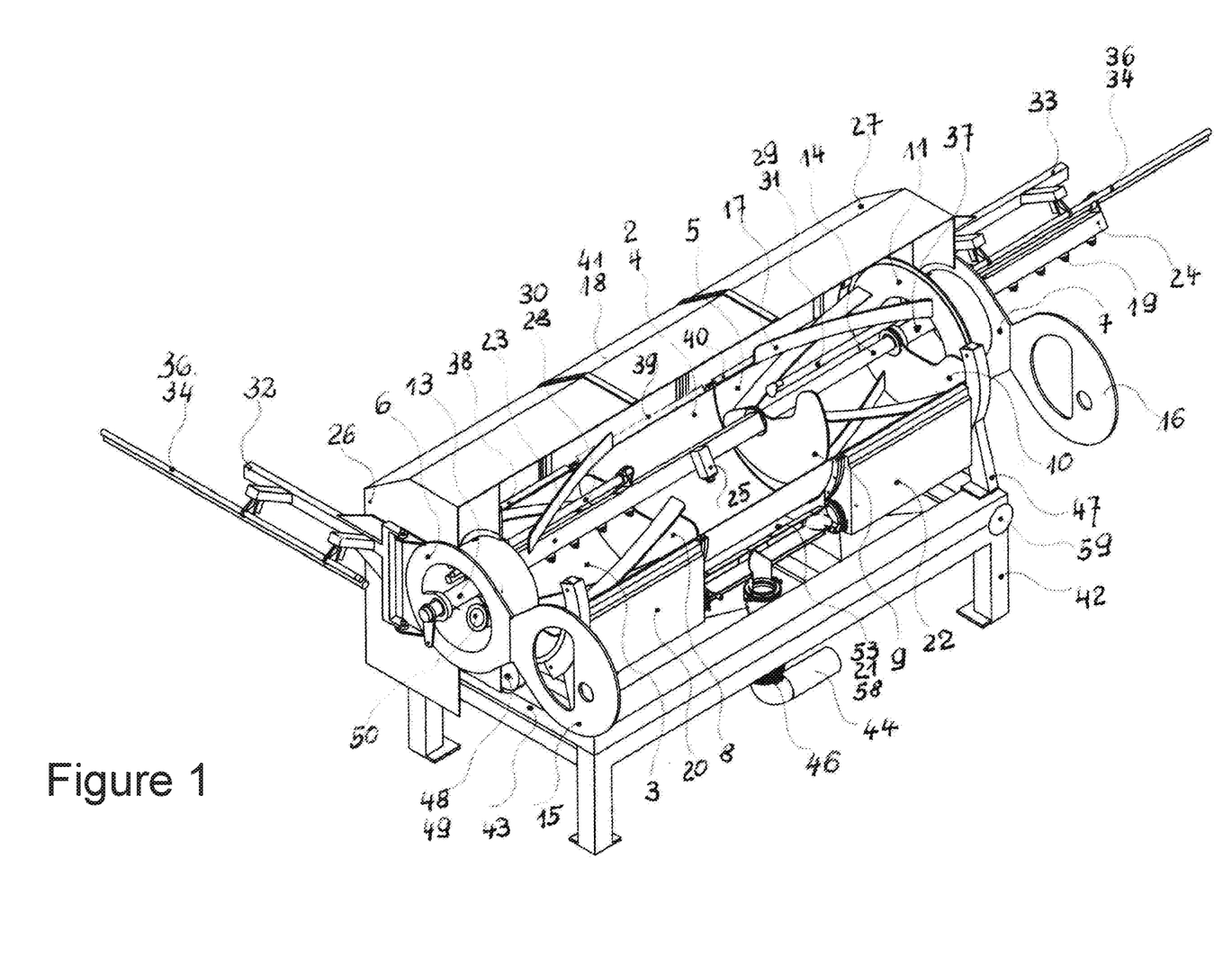
FIG. 1 is a perspective overall view of an example of an apparatus of the invention, viewed from the front side, with three cycle zones.

FIG. 1 shows, in a perspective view, an example of a coating apparatus of the invention with three cycle zones arranged in succession. The embodiment shown in FIG. 1 can be used, for example, for film coating of granular bodies (tablet cores) 1.

In this example, the hollow cylindrical drum 2 consists of three hollow cylindrical, perforated drum elements: a spray section 3, a middle section 4 for measuring the layer thickness achieved so far therein, and a section 5 in which the final spraying and emptying takes place. The three drum elements 3, 4 and 5 are axially connected to one another to form a drum 2. For reasons of improved clarity, the drum 2 is shown in horizontal half-section in FIGS. 1-3. The drum elements 3, 4 and 5 each form a cycle zone.

At each end of the assembled drum 2 there is a coater door housing 6 and 7 at the end; it uses sealing rings present in between to prevent the granular bodies (tablet cores) 1 from getting out of the drum 2 in an unwanted manner.

The drum 2 with the separating elements 8 and 9 forms the basis for the coating apparatus having three cycle zones.

Figures 4A, 4B, 4C:
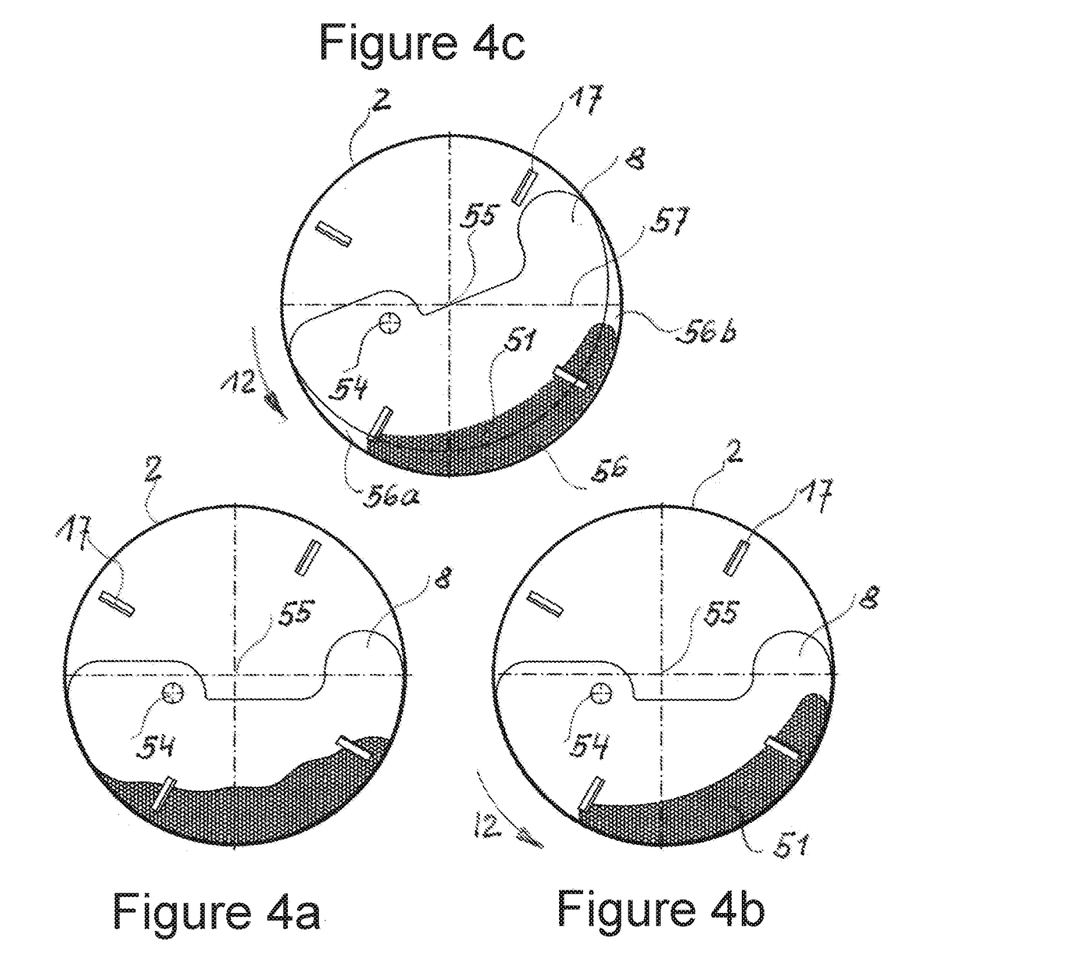

In addition, between the drum 2, in the last cycle zone for the processing of the granular bodies 1, and the coater door housing 7, there is an emptying chute 11 having an aperture, the wedge-shaped opening 56 of which, according to FIG. 4*c*, is between drum 2 and separating element 8, a further separating element 10 being arranged upstream of said emptying chute 11.

On the outside of the emptying chute 11, around the aperture, is a funnel-shaped metal sheet. It channels the granular bodies 1 flowing out in the outward direction into a waiting vessel.

By means of the shafts 13 and 14, the required "open or closed" position for the separating elements 8, 9 and 10 is set by the rotation of the shafts 13 and 14. The separating elements 8, 9 and 10 are secured rigidly on at least one of the shafts 13 and 14. The mount of the shaft is on the two coater housings 6 and 7, and the shafts 13 and 14, for the purpose of manipulation, project out of the closed coater doors 15 and 16. The pneumatic drive (not shown) is also present at that point for movement of the separating elements 8, 9, 10 into the abovementioned positions.

The separating elements 8 and 9, in the closed state, divide the drum 2 into three cycle zones I to III, in which subsequent manufacturing processes for surface coating of the granular bodies 1 (tablet cores) can be conducted independently of the adjacent cycle zones.

The following manufacturing processes take place therein:

In the drum element 3 for the cycle zone 1:
charging of the granular bodies (tablet cores) 1 as a charge/batch through the front coater door 5,
mixing of the granular bodies 1 by means of 4 radial paddles 17,
heating of the granular bodies in a hot air stream,
spraying of the bed formed with the granular bodies 1 with the aid of spray nozzles 19,
drying of the granular bodies.

In the drum element 4 for the cycle zone II:
monotonous movement of the granular bodies 1, owing to lack of radial paddles 17,
further drying of the sprayed layer on the surfaces of the granular bodies 1 by means of hot air from air supply feed/shoe 21,
measurement of the layer thickness achieved in the coating formed on surfaces of granular bodies 1.

In the drum element 5 for the cycle zone III:
heating of the granular bodies 1 in the hot air stream,
final spraying of the coating onto surfaces of granular bodies 1 with the aid of spray nozzles 19,
drying of the granular bodies 1 and subsequent cooling,
emptying by means of rotation of the separating element 10 via the emptying chute 11, mounted on the back coater door housing 7. The separating element 10 is rotated here about its axis of rotation defined by the shaft 14 so as to result in an opening between the inner wall of the drum element 10 and the underside of the separating element 10, through which the granular bodies 1 can exit.

The spray nozzles 19 for coating of the surfaces of the granular bodies 1 are mounted on a nozzle arm 23. This consists of a sheet metal housing in which there are supply conduits for the spray nozzles 19. These conduct compressed air for opening and closing of the spray nozzles 19 and for atomization of the liquid to be entrained to the spray nozzles 19.

A measurement module 25 for determination of the layer thickness of the coating formed on surfaces of granular cores 1 is mounted on a nozzle arm 24. For positioning of the measurement module 25 in the cycle zone II, the nozzle arm 24 was correspondingly lengthened.

At the end of the nozzle arm housing there are multiple sockets, the conduits from which (not shown) are guided outward through the inner wall of the coater door housing 6 and 7 via the upper part of the wet cell 26 and 27.

The nozzle arms 23 and 24 are suspended on support bars 28 and 29 which, together with a parallel bar 30 and 31 as torque strut, enable movement of these into the working positions within the drum 2 by means of slide bushes. The support bars 28 and 29 and the torque strut bars 30 and 31 are each secured on one of the coater door housings 6 and 7. Since the torque strut system 30 and 31 is effective only in the working position, the nozzle arms 23 and 24 can be pivoted, such that no collision with the separating elements 8, 9 and 10 can take place during the movement.

Analogously to the nozzle arm arrangement, there is one support frame 32 and 33 each outside the drum 2, which, mounted in a rotatable manner on the coater door housings 6 and 7, can accept the nozzle arms 23 and 24 when they are pulled out of the drum 2. For this purpose, the support frame has to be pivoted such that the support bars 28, 29, 34 and 35 and the bars for absorbing the torque 30, 31, 36 and 37 from the drum 2 and support frame 32 and 33 are flush to one another.

Thereafter, the nozzle arms 23 and 24 are moved onto the support frames 32 and 33. Together with the nozzle arms 23 and 24, the support frames 32 and 33 can be pivoted by 90° in the direction of the wall of the wet cell 41. The maintenance of the spray nozzles 19 can be conducted in that position. The measurement module 25 can likewise also be checked. If the support frames 32 and 33 together with the nozzle arms 23 and 24 have to go into an intensive wash, it is possible beforehand to remove the abovementioned measurement module 25, to seal the socket connectors watertight and to raise the support frame 32 or 33 out of the mount on the coater door housing 6 and 7 and transport it away together with one nozzle arm 23 or 24 in each case.

Without the torque struts 30 and 31, the nozzle arms 23 and 24 would hang vertically downward, but with the torque struts 30 and 31 the defined oblique position for the spray nozzles 19 can be fixed, where the spray axes then adopt a quasi-orthogonal position to surfaces of granular bodies 1.

As already mentioned, it is an indispensable prerequisite that, where the spraying takes place, i.e. in the cycle zones I and III, there are radial paddles 17 for the purpose of mixing the bed 51 formed by granular bodies 1 on the inner wall of the drum.

The process air for heating, cooling and drying of the granular bodies 1 is brought to the drum 2 with the aid of air supply shoes 20, 21 and 22 and waste air shoes 38, 39 and 40 (not shown).

In each cycle zone there is an air supply shoe and waste air shoe for the process air. The air supply is brought firstly to the middle cycle zone II of the air supply and waste air shoe 21 and 39, and from that point it is distributed by throttle valves 58 and slide valves 59 to the adjacent air supply shoes 20, 22 and waste air shoes 30, 40.

The air supply shoes 20, 21, 22 and waste air shoes 38, 39, 40 each encompass ¼ of the circumference in the lower region of the drum 2. In other words, the air supplied passes firstly via an air supply shoe 20, 21, 22 through the perforation of the drum 2 into the bed 51 and, after flowing through the bed 51, passes through the perforation of the drum wall into the waste air shoe 38, 39, 40 and thence into a central air outlet.

In addition, the coating apparatus has what is called a wet cell 41; this not only channels the sprayed wash water into separate outflow conduits but is also involved in the air supply during the coating process. In the wet cell 41, there are generally apparatuses provided for cleaning of the drum by means of high-pressure nozzles and troll balls.

The wet cell 41 consists of the frame 43 that accommodates the wash water in a base tank and conducts it outward, and the wet cell upper portions 28, 27, 18 mounted thereon. The wet cell upper portions 28, 27, 18 that have been sealed with respect to one another are connected with sealing by the frame 43. The separable wet cell upper portions 28, 27, 18 have the advantage that assembly operations, for example on the drum 2, are made significantly easier thereby. For example, after the outer wet cell upper portions 28 and 27 have experienced a slight axial movement with respect to one another, the wet cell upper portion 18 can be removed and the middle drum element 4 can be deinstalled. Thereafter, it is possible to adjust the separating elements 8, 9 and the shafts 13, 14, or to undertake maintenance or replacement operations.

The wet cell 41 together with the frame 43 can be tilted along the longitudinal axis of the drum. For this purpose, the two are connected to the frame 43 by means of a pivot bearing 59.

The coater door housings 6, 7 are secured to the outer wet cell upper portions 28, 27 by mounting on the bulkhead between the walls in the wet cell upper portions 28, 27.

In addition, supply conduits for nozzle arms 23, 24 are guided outward through the coater door housing 6, 7 and thereafter between the bulkhead walls of the outer wet cell upper portions 28, 27.

Figure 3:
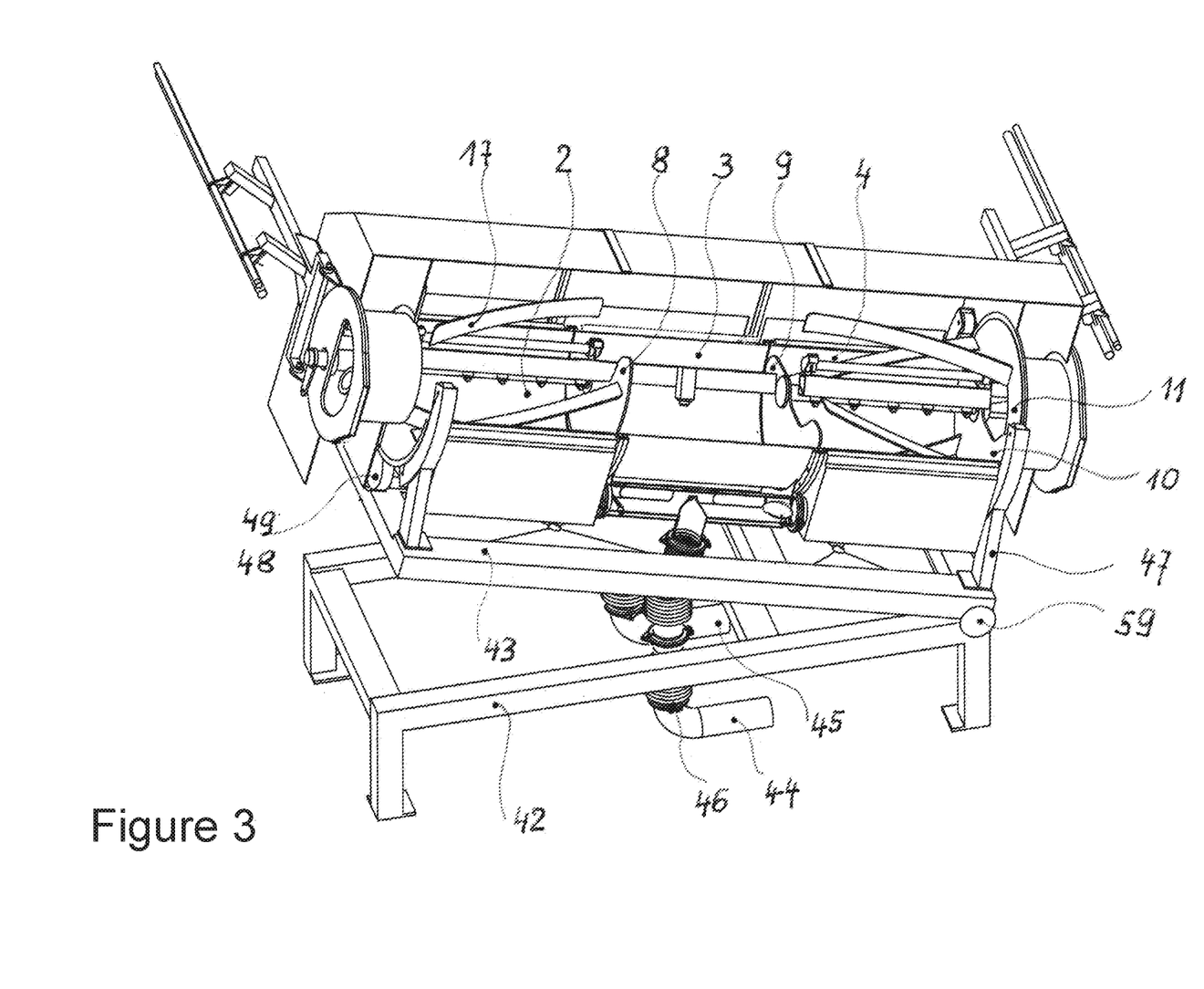
FIG. 3 is an analog of FIG. 2, in which the transfer of granular bodies, especially of tablet cores, from one cycle zone to the adjacent cycle zone is being implemented.

FIG. 3 shows the tilted position of drum 2 and wet cell 41 in order that the granular bodies 1 can pass into the lower cycle zones II and III, or outward through the emptying chute 11.

The tilting of the drum 2 can be achieved by a compressed air cylinder (not shown).

The external air supply to and removal of waste air from the coating apparatus is effected in each case through a central pipeline 44, 45 connected at a fixed location to a central air processing system (not shown). Metal bellows 46, in the case of tilting of the coating apparatus for transfer of granular bodies 1, assume the task of positional compensation between air supply shoe and waste air shoe 21, 39 and the fixed central pipelines 44, 45.

The drum 2 is doubly mounted on 4 support bearings 47. Wheel flanges absorb the slope-induced downward forces (gravitational forces) in the tilting of the longitudinal axis of the drum for the purpose of transfer of granular bodies 1. For rotation, the drum 2 can be driven by a friction drive 48 and compressed air motor 49.

The coating apparatus has the following dimensions, not including the dimensions of the external support frame where the nozzle arm 23 or 24 can be rested for the purpose of maintenance:

| | |
|---|---|
| drum diameter | 700 mm |
| length | 2900 mm |
| width | 1150 mm |
| height of the drum axis relative to floor level | 1100 mm |
| height including wet cell | 1600 mm |

The process is to be elucidated in detail by a use example. This involves the production of film layers on surfaces of granular bodies 1 having a relatively small layer thickness of =<50 μm, measured with an RSD value of <2%. However, an inline measurement with a rotating drum 2, in spite of comparatively high-quality measurement systems, for example the OCT, requires that, in the measurement zone no excess uncontrolled movement of granular bodies 1 as arises in the mixing of the granular bodies 1 takes place, the air layer between the granular bodies 1 and the measurement module 25 is free of spray mist, and the distance between measurement object and measurement module 25 remains at a minimum owing to transmission losses.

The three boundary conditions mentioned have a considerable effect on the resolution achieved, which, with layer thicknesses of 50 μm, measured with an RSD value of 2%, should be <1 μm.

These requirements are achieved in the invention by separation of the process procedures into cycle zones suitable for the purpose.

Figure 2:
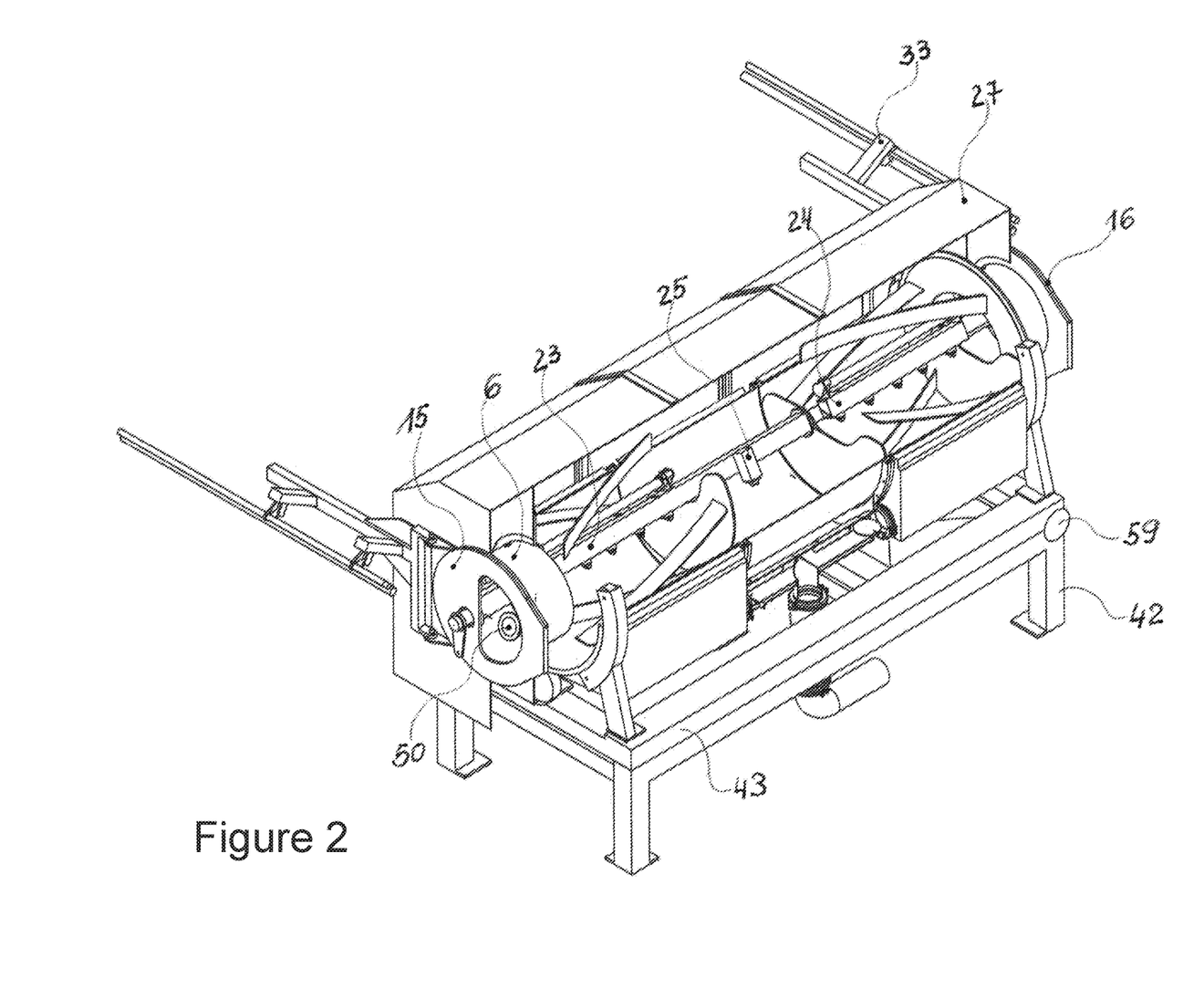
FIG. 2 is the analog of FIG. 1, in which the preparation for startup is complete.

FIG. 2 shows a coating apparatus prepared for the coating. Compared to FIG. 1, the rear nozzle arm 24 has likewise been moved into the drum 2. The front nozzle arm 23 does not just execute the spraying in the cycle zone I, but also, in the extension thereof, executes the measurement of layer thickness with the measurement module 25 in the cycle zone II. With the rear nozzle arm 24, the spraying is continued in the cycle stage III. The front and rear coater door 15, 16 was closed. The support frame 33, after a rotation of 90°, rests against the wall of the wet cell upper portion 27.

Via the filling stub 50 on the front coater door housing 6, the cycle zone I is laden with the first batch/charge. Thereafter, the filling stub 50 is moved axially within a tube to such an extent that the coater door 15 can be closed.

FIG. 4 shows orthogonal sections to the longitudinal drum axis 55. FIG. 4a shows the granular bodies 1 in the lower portion of the drum 2 after the loading of cycle zone I. The separating element 6 is closed and separates the cycle zones I and II from one another. The underside of the separating element 6 lies here against the inner wall of the drum 2.

Subsequently, the drum 2 rotates about its longitudinal axis in a counterclockwise direction, shown by the arrow 12. The granular bodies 1 then form the striking kidney-shaped bed 51 according to FIG. 4b, predominantly with the aid of the perforation in the drum wall 2. The four radial paddles 17 mounted on the inner wall of the drum turn the bed 51 over permanently and mix the granular bodies 1. This effect is an important prerequisite for the later formation of a homogeneous layer thickness distribution on the surfaces of the granular bodies 1 of the application of coatings, especially of film layers.

First of all, according to FIG. 1, in the cycle zone I, the hot air supplied removes the greatest proportion of water from the granular bodies 1. This is accomplished with the aid of the air supply shoe 20. All the air supply and waste air shoes used each enclose ¼ of the drum wall in the lower portion. The hot air passes from that point through the perforation in the drum wall into the bed 51 and, after flowing through, exits again into the waste air shoe 38 mounted opposite via external air processing.

In the further treatment with hot air, the dried granular bodies 1 reach a surface temperature at which the coating can form on the surfaces of the granular bodies 1 in the spray application of a liquid with solids present therein. It is possible here to at first to raise the adhesion for spray droplet formation by virtue of the greater adsorption of the surfaces of granular bodies 1 when they are hit by the droplets and the liquid can spread rapidly. If, for example, the spray liquid consists predominantly of monomer separated by water molecules, a polymeric film layer of polyethylene, polypropylene, polyvinyl chloride, polycaprolactone inter alia would form during the removal of water. Without addressing the topic of film formation from monomers in more detail, it can be seen that there is a need for this purpose for processing conditions which inter alia prevent sticking of the tablet cores to one another, since the tablets could get to the interior of the tablet bed relatively briefly after spraying with the aid of the radial paddles 17. In order to avoid sticking, it is important that the bed 51 is in motion over the entire process time. Unfortunately, sticking cannot fundamentally be ruled out; therefore, the parameters of spray rate, surface temperature of the granular bodies 1, speed of the drum 2 should additionally be set such that a layer with a low tendency to sticking can form within the relatively short time.

In the cycle zone I, in relation to the target layer thickness, about 80% of the desired coating thickness should be applied. After the end of the coating in the cycle zone I, the layers are still subjected to further drying and then the transfer into the cycle zone II is implemented.

The speed of the drum II is maintained here or slightly reduced, and the granular bodies 1 with their kidney-shaped bed 51 do not reach the theoretical middle 57 according to FIG. 4*c* in vertical direction.

The separating element 8 is opened by means of the shaft 13 by rotating about the tilt axis 54. This gives rise to an opening 56 between the underside of the separating element 8 and the inner wall of the drum 2. At the same time, the longitudinal drum axis 55 is tilted in the emptying direction (see FIGS. 4*c* and 5) and the granular bodies 1 can leave the cycle zone I. The effect of the asymmetric arrangement of the tilt axis 54 with respect to the longitudinal drum axis 55 is that a wedge-shaped opening 56 (FIG. 4*c*) forms at the base of the drum. Through the opening 56 formed, the granular bodies 1 pass into the adjacent cycle zone II, since, with the rotary movement of the drum 2, the friction at rest between the granular bodies 1 and with respect to the drum wall is eliminated and they slide under the influence of gravity into the adjacent, lower-lying cycle zone II. Considering FIG. 4*c*, it can be seen that the granular bodies 1, in the wedge piece at the upper and lower ends of the opening 56*a*, 56*b*, could collide with the rotating drum 2 and the fixed separating element 8. This is not the case for the following reasons: firstly, granular bodies 1 close to the lower end of the opening 56*a* are drawn right away from the wedge piece 56*a* of the opening 56 by the rotating of the perforated drum 2. Secondly, the upper wedge piece 56*b* of the opening 56 is above the dashed-and-dotted line 57 and is not reached by the bed 51. The dashed-and-dotted line 57 may be arranged horizontally in the plane in which the axis of rotation 55 or the middle axis of rotation of the drum 2 is arranged.

Once the granular bodies 1 have arrived in the cycle zone II, the separating element 8 is closed again by pivoting back and the coating apparatus is brought into its original position. The coating apparatus can be filled again with granular bodies 1 and analogously to the manner described through the cycle zone I.

Even though further coating should take place in the cycle zone III in order that the target layer thickness is achieved, the granular bodies 1 are first dried further in the cycle zone II. The reason for this is that, in the cycle zone II, prior to the measurement of the layer thickness of the coatings formed on surfaces of granular bodies 1, a layer similar to the later real final conditions is formed, since the water is fully removed and the shrinkage of the layer is complete. If the layer thickness is measured inline, for example optically by means of computer-assisted coherence tomography, the layer thickness value ascertained here can become a new starting condition value. The difference between the new starting condition value and the set target layer thickness can then be used to ascertain the spray rate for the cycle zone III. Since, with the value achieved, a real starting condition which has been measured with high-resolution and accuracy is being utilized. The probability for subsequent deviation with respect to the target layer thickness employing low spray rates can thus be several times less than if the coating were to be effected in one operation.

A boundary condition for this procedure in the cycle zone II is that, as emphasized, firstly, the measurement is undertaken with high-resolution means of measurement and, secondly, the measurement operation proceeds under boundary conditions that as far as possible do not restrict the resolution of the measurement system. For this reason, no radial paddles 17 should be used or should be present in the cycle zone II. The effect of this measure is that a monotonous, flowing bed can form in the cycle zone II. Thus, excessive movement of the granular bodies 1 triggered by the radial paddles 17 is eliminated; the granular bodies 1 also move more slowly in relative terms. The optical measurement module 25 can be brought closer to the bed 51 in the cycle zone II; thus, transmission losses between measurement object and measurement module 25 becomes smaller. The latter is also assisted by the relatively high distance from the spray zones in cycle zones I and III; in other words, the spray mist that would otherwise be disruptive also has no effect on the measurement result for the layer thicknesses determined for the coating.

Owing to the high quality demands and the exhaustion of the measurement potential by virtue of the abovementioned boundary conditions, the OCT measurement process would be the given choice.

After the granular bodies 1 with coating formed on surfaces have dried and the layer thickness has been measured, the transfer of the tablets into the cycle zone III can be initiated. In other words, the drum speed still remains constant, the separating element 7 is opened and the coating apparatus according to FIG. 3 is tilted. Granular bodies 1 are transferred as described above into the cycle zone III which is then lower.

If granular bodies 1 are present in the cycle zone I, they are subsequently conveyed analogously into the empty cycle zone II. In addition, refilling of the cycle zone I with granular bodies 1 is also possible.

In the cycle zone III, the coating thickness still absent on the surfaces of the granular bodies 1 is applied. As already described, the spray rate necessary for the remaining cycle time is calculated by prior measurement of the layer thickness in cycle zone II.

After the spraying, the granular bodies 1 are dried and emptied out of the coating apparatus via the emptying chute 11 with the separating element 10 open.

The emptying operation begins as in the transfer within the above-described cycle zone; in other words, the coating apparatus is first tilted, the separating element 10 is opened by rotation of the shaft 37 and the transfer begins through the emptying chute 11 outward.

Subsequently, with the drum 2 rotating permanently, the transfer is repeated, commencing with closure of the separating element 10 in the emptying chute 11 and the opening of the separating element 9 for the purpose of transfer of granular bodies 1 from cycle zone II to III. Thereafter, the separating element 9 is closed again and the separating element 8 is opened for the purpose of transfer from cycle zone I to II. Thereafter, this operation is repeated and the separating element 8 is closed. The coating apparatus is then tilted back into the normal position and the cycle zone I is filled again via the filling stub 50 with a batch/charge of uncoated granular bodies 1.

What is claimed is:

1. A coating apparatus for granular bodies, the coating apparatus comprising
   a rotatable, hollow cylindrical, perforated drum (2) as an accommodation unit for accommodating the granular bodies (1), in which there is an introduction device with a coater door (15) and coater housing (6) for granular bodies (1) and in which there is disposed at least one movable separating element (8, 9, 10) with which one cycle zone can be partly separated from a subsequent cycle zone, such that transfer of granular bodies (1) from one cycle zone to a subsequent cycle zone is achievable in a defined manner by a movement of the at least one separating element (8, 9, 10) that leads to release;
   wherein an interior of the drum (2) is divided in a longitudinal direction into at least one cycle zone (I) as a spray section and a further cycle zone (II; III),
   wherein a spray apparatus for application of a liquid or suspension with which a coating can be formed on the surface of the granular bodies (1) is disposed in one cycle zone (I), and an outlet in a cycle zone (III) arranged downstream, and
   wherein the at least one separating element (8, 9, 10) is movable from a closed position, in which a closed subregion of an underside of the at least one separating element (8, 9, 10) lies radially flush against an inner wall of the drum (2) or is arranged at a distance from the inner wall of the drum (2) with a gap measuring less than the external diameter of the granular bodies (1), and the at least one separating element (8, 9, 10) is configured so as to leave a clear space above the closed subregion between the cycle zone (I) and a cycle zone (II, III) arranged downstream, into an open position, in which the subregion is spaced apart at its underside from the inner wall of the drum (2) and in this position of the separating element (8, 9, 10) there is an opening in the lower region between the underside of the respective separating element (8, 9, 10) and the inner wall of the drum (2) between the cycle zone (I, II, III) arranged upstream in process direction and one arranged thereafter, through which the granular bodies (1) can pass.

2. The coating apparatus according to claim 1, characterized in that the at least one separating element (8, 9, 10) is rotatable with orthogonal alignment relative to the longitudinal axis in the drum (2) about a second axis of rotation arranged eccentrically in the drum (2) and at a distance from the center of the circle defined by the radius of the curved form of the underside of the at least one separating element (8, 9, 10) and aligned parallel to the axis of rotation or longitudinal axis of the drum (2).

3. The coating apparatus according to claim 2, characterized in that the at least one separating element (8, 9, 10) is configured to be shifted orthogonally to the longitudinal axis of the drum (2) by a linear movement.

4. The coating apparatus according to claim 1, characterized in that the at least one separating element (8, 9, 10) is configured to be shifted orthogonally to the longitudinal axis of the drum (2) by a linear movement.

5. The coating apparatus according to claim 1, further comprising at least one radial paddle (17) for mixing of granular bodies (1) of rotation of the drum (2) disposed on the inner wall of the drum (2) in at least one of the cycle zones (I, II, III).

6. The coating apparatus according to claim 1, characterized in that a tilting or pivoting apparatus is disposed in the drum (2), by means of which the drum (2) can be tilted at various angles, such that, under the action of gravity, on implementation of a tilt, granular bodies (1) are movable from one cycle zone into a subsequent cycle zone (I, II, III) or out of the coating apparatus when the separating element (8, 9, 10) is open.

7. The coating apparatus according to claim 6, wherein the tilting or pivoting apparatus is disposed beneath the drum (2) and has a pivot bearing (59) and at least one tilt or pivot drive.

8. The coating apparatus according to claim 1, characterized in that an axis of rotation $D_T$ (55) of the at least one separating element (8, 9, 10) is arranged at a distance from the longitudinal axis of the drum in the opposite direction in relation to the direction of rotation of the drum (2) and alongside an axis of rotation $R_A$ (54) of the drum (2).

9. The coating apparatus according to claim 1, characterized in that at least three separating elements (8, 9, 10) are disposed in the drum (2), by means of which three cycle zones (I, II, III) are formed as subsections, wherein in the foremost cycle zone (I) in process direction there is a spray apparatus (23) with spray nozzles (19), and in a downstream cycle zone (II) there is a measurement module (25) for determining the layer thickness of the coatings applied to surfaces of the granular bodies (1), and in a cycle zone (III) arranged downstream thereof in process direction there is a further spray apparatus (24).

10. The coating apparatus according to claim 9, characterized in that a support frame (32, 34) arranged outside the drum (2) is configured to be connected in a pivotable manner to a support bar (34), such that the support bar (32, 33) with the drum (2) open lies flush against a support bar (28, 29) and the spray apparatus(es) (23, 24) and/or the measurement module (25) can be moved out of the interior of the drum (2).

11. The coating apparatus according to claim 9, characterized in that the drum (2) has a coater door housing (6, 7) at either end, on each of which there is secured a support bar (28, 29) and there is disposed a coater door (6, 7) and a mount for a shaft (13, 14, 37) connected to the at least one separating element (8, 9, 10), where the shafts (14, 37) are mounted coaxially to one another.

12. The coating apparatus according to claim 1, characterized in that at least three separating elements (8, 9, 10) are disposed in the drum (2), by means of which three cycle zones (I, II, III) are formed as subsections, in the form of drum elements (3, 4, 5) in the drum (2), wherein in the foremost cycle zone (I) in process direction there is a spray apparatus (23) with spray nozzles (19), and in a downstream cycle zone (II) there is a measurement module (25) for determining the layer thickness of the coatings applied to surfaces of the granular bodies (1), the measurement module including a measurement apparatus for performing optical coherence tomography, and in a cycle zone (III) arranged downstream thereof in process direction there is a further spray apparatus (24).

13. The coating apparatus according to claim 1, characterized in that there are two support bars (28, 29) that run parallel to the longitudinal axis of the accommodation unit disposed in the drum (2), which are secured to the coater door housings (6, 7) on which the spray apparatuses (23, 24) with spray nozzles (19) and/or, if present, measurement module (25) is/are arranged so as to be movable.

14. A method of coating granular bodies, with an apparatus according to claim 1,
    wherein the granular bodies (1) are introduced into the drum (2) of the coating apparatus and with the drum (2) rotating are introduced into a cycle zone (I) which is arranged first in process direction and has a spray apparatus, and surfaces of the granular bodies (1) are coated,
    wherein the cycle zone (I) arranged first is separated from at least one cycle zone (II, III) arranged downstream by a separating element (8, 9, 10),
    wherein the granular bodies (1) are dried, coated and then cooled in a cycle zone (II) arranged downstream of the cycle zone (I) arranged first with the accommodation unit (1) rotating,
    wherein a respective separating element (8, 9, 10) for a transfer of granular bodies (1) into a cycle zone arranged downstream or out of the drum (2) is moved into the open position, in which the underside of the respective separating element (8, 9, 10) at least in one region has a greater distance from the inner wall of the drum (2) than the external diameter of the granular bodies (1) and hence an opening has been provided in the lower region between the underside of the respective separating element (8, 9, 10) and the inner wall of the drum (2) between the at least one cycle zone (I, II, III) or for the exit of coated granular bodies (1) from the drum (2), as a result of which the granular bodies (1) are transported into the cycle zone (II, III) arranged downstream in the drum (2) and/or the granular bodies (1) are transported out of the drum (2) with the separating element (10) open, and
    wherein, for transporting of the granular bodies (1) within the drum (2) tilting is affected by means of a tilting or pivoting apparatus disposed on the drum (2) about a tilt axis of the drum (2) aligned orthogonally with respect to the axis of rotation or longitudinal axis of the drum (2).

15. The method according to claim 14, characterized in that there is at least one radial paddle (17) disposed in at least one of the cycle zones (I, III), by means of which the granular bodies (1) are mixed on rotation of the drum (2).

16. A method of coating granular bodies with an apparatus according to claim 1,
    wherein the granular bodies (1) are introduced through the coater door (6) into the hollow cylindrical drum (2) of the coating apparatus and with the drum (2) rotating are coated on their surfaces in at least one of the cycle zones (I, III) in the at least one spray apparatus in the drum (2),
    wherein the at least one cycle zone (I, III) is formed by at least one separating element (8, 9, 10) disposed within the drum (2),
    wherein a respective separating element of the at least one separating element (8, 9, 10) remains in a closed position during the coating of the granular bodies (1), and where the underside of the respective separating element (8, 9, 10) lies flush against the inner wall of the drum (2) or is arranged at a distance from the inner wall of the drum (2) with a gap measuring less than the external diameter of the granular bodies (1), and a clear space remains above the closed subregion of the respective separating element of the at least one separating element (8, 9, 10) between a cycle zone (I, II) arranged upstream and a cycle zone (II, III) arranged downstream in process direction,
    wherein the granular bodies (1) in at least one of the cycle zones (I, II, III) of the rotating drum (2) are dried and then cooled,
    wherein the at least one separating element (8, 9, 10) is movable in parallel to the axis of rotation or longitudinal axis of the drum (2) and for transporting of the granular bodies (1) a separating element (8, 9, 10) closed in each case in the drum (2) is moved in the direction of the coater door (7) to such an extent that granular bodies are moved out of the drum (2) and/or granular bodies are moved from a cycle zone (I, II) into a cycle zone (II, III) arranged downstream in process direction, wherein the respective separating element of the at least one separating element (8, 9, 10) is then moved into an open position,
    wherein the subregion on the underside of the respective separating element of the at least one separating element (8, 9, 10) is spaced apart from the inner wall of the drum (2) to such an extent that there is an opening in the lower region between the underside of the respective separating element of the at least one separating element (8, 9, 10) and the inner wall of the drum (2) between the respective cycle zone (I, II, III), a cycle zone (II, III) arranged downstream in process direction or the emptying chute (11) from which granular bodies (1) exit from the drum (2), and the respective separating element (8, 9, 10) is then moved back to an original position and is moved there into the closed position.

17. The method according to claim 16, characterized in that there is at least one radial paddle (17) disposed in at least one cycle zone (I, III), by means of which the granular bodies are mixed on rotation of the accommodation unit (1).

18. The method according to claim 16, characterized in that the at least one separating element (8, 9, 10) is aligned orthogonally to the axis of rotation or longitudinal axis (55) of the drum (2) and is moved orthogonally to the axis of rotation or longitudinal axis (55) by a rotating motion for opening or closure.

19. The method according to claim 16, characterized in that three separating elements (8, 9, 10) are disposed in the drum (2), by means of which three cycle zones (I, II, III) are formed and the three separating elements (8, 9, 10) are each movable into the closed position and the open position, wherein, with the drum (2) rotating, in the cycle zone (I) arranged first, granular bodies (1) are introduced into the drum (2) and preheated, and a first part of the coating is applied to the granular bodies (1) therein by spraying,
    wherein, in the cycle zone (II) arranged thereafter in process direction, a determination of layer thickness on the coating applied is conducted,
    wherein, in the cycle zone (III) that follows on from this cycle zone (II) in process direction, a second part of the coating is applied up to a given layer thickness and the coated granular bodies (1) are dried and then pass out of the drum (2) after separating element (10) has been opened.

20. The method according to claim 19 wherein, in the cycle zone (II) arranged thereafter in process direction, a determination of layer thickness on the coating applied is conducted by optical coherence tomography.

* * * * *